(12) United States Patent
Satta et al.

(10) Patent No.: US 6,593,719 B2
(45) Date of Patent: Jul. 15, 2003

(54) DISTURBANCE COMPENSATION CONTROL SYSTEM

(75) Inventors: Hiroki Satta, Ichinomiya (JP); Kayoko Ikeda, Chiryu (JP); Yoshikazu Kondou, Kariya (JP); Satoru Onozawa, Anjo (JP); Eitaku Nobuyama, Fukuoka (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/026,534

(22) Filed: Dec. 27, 2001

(65) Prior Publication Data

US 2002/0097992 A1 Jul. 25, 2002

(30) Foreign Application Priority Data

Dec. 27, 2000 (JP) ........................................ 2000-398574

(51) Int. Cl.$^7$ ............................................ G05D 23/275
(52) U.S. Cl. ...................... 318/632; 318/609; 318/610; 318/638
(58) Field of Search .................. 318/560, 565, 318/568.18, 568.22, 569, 600, 609–611, 623, 632, 638, 715, 798, 799; 388/800, 809, 811–815

(56) References Cited

U.S. PATENT DOCUMENTS

| | | | | | |
|---|---|---|---|---|---|
| 4,450,393 | A | * | 5/1984 | Kohzai et al. | 318/592 |
| 4,914,361 | A | * | 4/1990 | Tajima et al. | 318/254 |
| 4,914,365 | A | * | 4/1990 | Murakami et al. | 318/609 |
| 5,043,834 | A | * | 8/1991 | Kubo et al. | 360/105 |
| 5,216,342 | A | * | 6/1993 | Torii et al. | 318/568.1 |
| 5,745,362 | A | * | 4/1998 | Hiroi et al. | 364/162 |
| 5,764,017 | A | * | 6/1998 | Bauck | 318/610 |
| 5,889,350 | A | * | 3/1999 | Yamamoto | 310/316 |

FOREIGN PATENT DOCUMENTS

JP          2566033 B2       10/1996

\* cited by examiner

*Primary Examiner*—Bentsu Ro
*Assistant Examiner*—Rina I. Duda
(74) *Attorney, Agent, or Firm*—Burns, Doane, Swecker & Mathis, LLP

(57) ABSTRACT

A disturbance compensation control system which restricts periodic disturbance of a control object such as a motor includes a repetition control unit. The repetition control unit restricts the periodic disturbance to the control object. The repetition control unit is designed so as not to perform a repetition compensation control when the control object is initially started.

22 Claims, 4 Drawing Sheets

DISTURBANCE COMPENSATION CONTROL SYSTEM

This application is based on and claims priority under 35 U.S.C. §119 with respect to Japanese Application No. 2000-398574 filed on Dec. 27, 2000, the entire content of which is incorporated herein by reference.

FIELD OF THE INVENTION

This invention generally relates to an electrically controlled device. More particularly, the present invention pertains to a disturbance compensation control device that restricts the periodic disturbance generated by a periodic compensation control and applied to an electrically controlled device.

BACKGROUND OF THE INVENTION

A known type of disturbance compensation control system is described in Japanese Patent Publication No. 2566033. This known system controls the control object, for instance an electrically driven motor, by way of a feed back control system using the difference (control tolerance) between a target rotation speed and an actual rotation speed. Further, this known system estimates a disturbance to the motor and effects repetition compensation control with respect to the estimated disturbance to eliminate periodic disturbance.

According to this known control system, because the motor is unstable at starting, the repetition cycle of the disturbance is also unstable. If this unstable disturbance is applied to the repetition compensation control, the accuracy of the motor operation with respect to the target speed will be decreased. This is particularly so in the case of apparatus having a short interval operating duration. Also, the delay with respect to the repetition compensation control will be worth to the stable control.

A need thus exists for a disturbance compensation control system which performs appropriate repetition compensation control and is not as susceptible to the same drawbacks and disadvantages as those noted above.

SUMMARY OF THE INVENTION

In light of the foregoing, one aspect of the invention involves a disturbance compensation control system which restricts periodic disturbance to a motor. The disturbance compensation control system includes means for calculating a target rotation speed of the motor, means for calculating an actual rotation speed of the motor, and means for calculating a difference between the target rotation speed of the motor and the actual rotation speed of the motor. A repetition control unit receives the calculated difference between the target rotation speed of the motor and the actual rotation speed of the motor, and repeatedly applies a compensated value to the calculated difference. The compensated value applied by the repetition control unit during initial starting of the control object is based on a zero value of the difference between the target rotation speed of the motor and the actual rotation speed of the motor.

According to another aspect of the invention, a disturbance compensation control system which restricts periodic disturbance of a control object includes means for calculating a target control condition of the control object, means for calculating an actual control condition of the control object, means for calculating a difference between the target control condition of the control object and the actual control condition of the control object, and a repetition control unit which receives the calculated difference between the target control condition and the actual control condition, and applies a value to the calculated difference, with the value applied by the repetition control unit during initial starting of the control object being based on a zero value of the difference between the target control condition and the actual control condition.

According to another aspect of the invention, a disturbance compensation control system which restricts periodic disturbance of a control object includes means for calculating a target control condition, means for calculating an actual control condition, means for calculating a difference between the target control condition and the actual control condition, and a repetition control unit which receives the calculated difference between the target control condition and the actual control condition, and applies a value to the calculated difference. The repetition control unit includes a phase converter.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
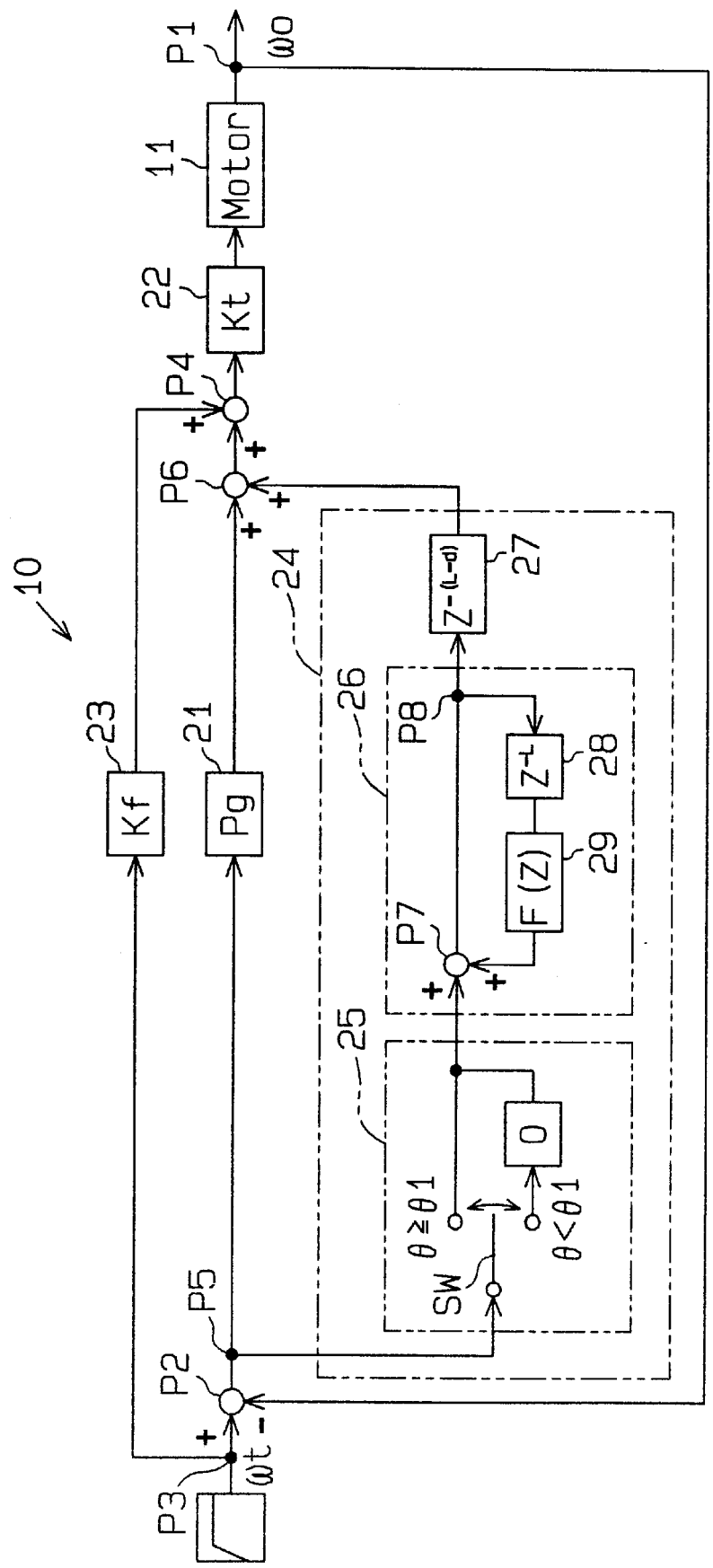
FIG. 1 is schematic illustration or block diagram of a disturbance compensation control system according to first embodiment of the present invention.
Figure 2:
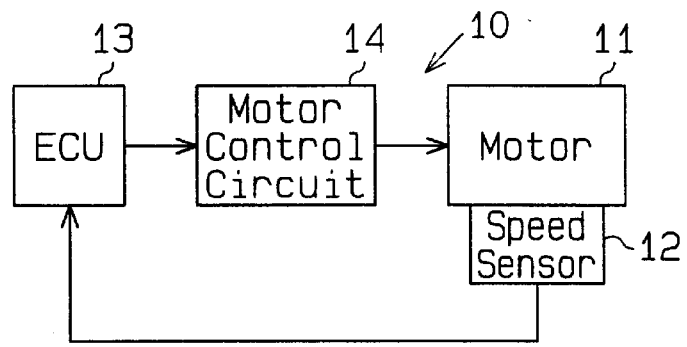
FIG. 2 is a schematic illustration of the motor control unit used in the control system.
Figure 3:
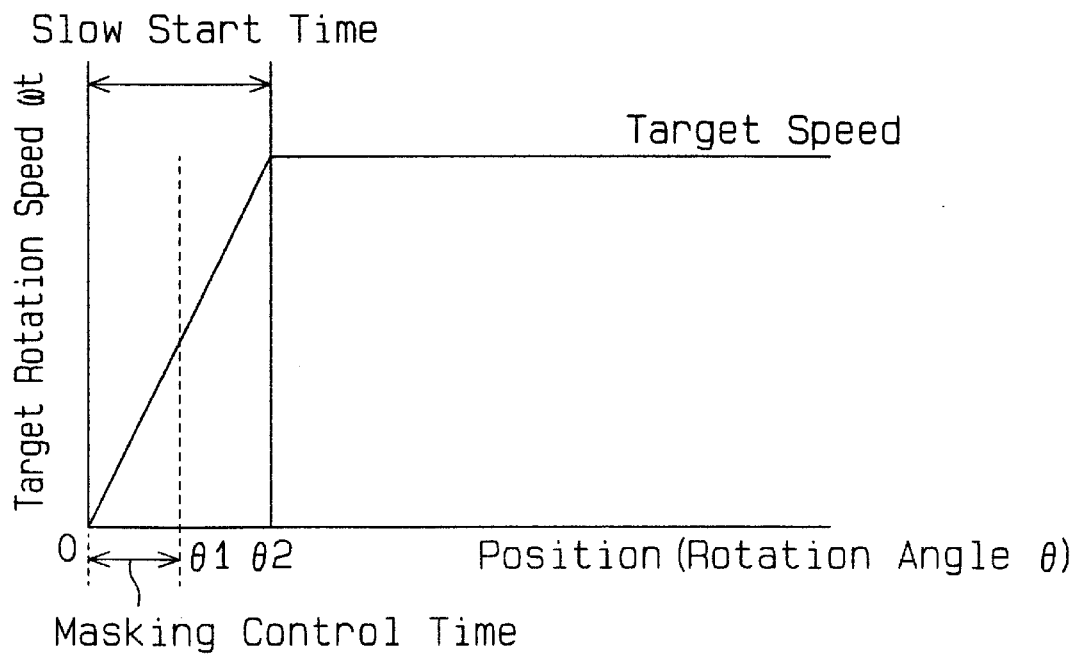
FIG. 3 is a chart showing operational characteristics of the present invention.

Referring to FIGS. 1–3, one embodiments of the present invention will be explained. FIG. 2 is an illustration of a motor control unit 10 used in the disturbance compensation control system of this embodiment. As shown in FIG. 2, the motor control unit 10 is equipped with a control object 11, which in this illustrated and described embodiment is in the form of a motor, a speed sensor 12, an ECU (Electronic Control Unit) 13, and a motor control circuit 14.

The motor 11 consists of, for instance, a direct-current motor. An unillustrated motor driven mechanical system is linked to the motor 11. The motor 11 drives and changes the position of the motor driven mechanical system by changing its rotation angle ($\theta$). Moreover, the motor 11 is controlled by a PWM (Pulse Width Modulation) control method to adjust its rotation speed. Therefore, the motor driven mechanical system, which is mechanically linked to the motor 11, is controlled by the PWM control method.

The speed sensor 12 detects the rotation speed together with the rotation angle of the motor 11. The speed sensor 12 is equipped with a Hall-Effect element, and the Hall-Effect element generates a pulse signal at every predetermined angle of the motor 11. Therefore, the rotation angle and rotation speed are calculated through the ECU 13.

The ECU 13 calculates, for example, the rotation speed and the rotation angle of the motor 11 according to the detected signal (pulse signal) from the speed sensor 12. The ECU 13 calculates the rotation angle of the motor 11 by counting the number of pulses generated by the speed sensor 12. The actual position of the motor driven mechanical system is also calculated using the speed sensor signal 12. Moreover, the ECU 13 calculates the actual rotation speed using the pulse signal which is continuously generated by the speed sensor 12.

According to this embodiment, the ECU 13 calculates the actual rotation speed at a particular position corresponding to a certain rotation angle (particular position of the motor driven mechanical system) of the motor 11. The ECU 13 calculates the amount of electricity or driving current to be supplied to the motor 11 based on a comparison of the target rotation speed and the detected actual rotation speed at the particular position corresponding to the certain rotation angle of the motor 11. Specifically, the drive signal which has a duty-ratio corresponding to the amount of electricity or driving current to be supplied to the motor 11 is outputted to the motor control circuit 14.

FIG. 1 is a control block diagram showing the motor control unit 10 and other components of the control system. As shown in FIG. 1, the control block of the motor control unit 10 constitutes the feedback system which determines at point P2 the difference between the target rotation speed ωt from the ECU 13 and the actual rotation speed ωo at point P1. The determined or calculated difference (control tolerance) between the actual rotation speed ωo and the target rotation speed ωt is amplified in an amplifier 21 which includes a proportional term Pg. The output from the amplifier 21 is modulated to an appropriate duty ratio through a duty converter 22, which includes a proportional term Kt, and the duty signal is outputted to the motor 11. The proportional term Pg of the amplifier 21 is set as an appropriate value to cause the actual rotation speed to promptly approach the target rotation speed ωt even in the presence of a disturbance.

As explained above, the rotation speed ωo and the target speed ωt are calculated at the particular position corresponding to the rotation angle, which means the particular position of the motor driven mechanical system, of the motor As shown in FIG. 3, the target rotation speed ωt, which comes from the ECU 13, increases gradually in response to the increase of the rotation angle of the motor 11 in a slow start stage. The target rotational speed ωt gradually increases in the slow start stage, and the target rotation speed ωt is maintained at a constant value when the rotation angle exceeds a certain position identified as θ2 in FIG. 3. This two stage operation is used to gradually increase the target rotation speed until achieving the constant target speed when the motor 11 is started. This performs a smooth operation of the motor 11 when the system is starting up. Also, jarring change sounds associated with the operation of the motor 11 are also reduced. For example, sounds generated by the backlashes and clearances of the motor 11, such as a torque transfer mechanism, are reduced.

The target rotation speed wt at point P3 is amplified with an amplifier 23 which has a feed forward term (proportional term) Kf, and this value is added at point P4 between the amplifier 21 and the duty converter 22. Thus, the difference between the actual rotation speed ωo and the target rotation speed ωt, which is amplified in the amplifier 21, is compensated by adding at point P4 the target rotation speed ωt which is amplified in the amplifier 23. The starting up characteristics of the motor 11 are improved by using the difference of rotation speed ωo and ωt through the duty converter 22. The feed forward term Kf of the amplifier 23 is set at a suitable value for improving the startup characteristic of the motor 11.

The difference between the rotation speed ωo and the target speed ωt at point P2 is pulled out at point P5, and the difference is added at point P6, which is positioned between the amplifier 21 and point P4, after passing through a repetition control unit 24. Thus, the difference (control tolerance) between the actual rotation speed ωo and the target rotation speed ωt, which is amplified in the amplifier 21, is compensated by repeatedly adding the compensated difference of the rotation speed ωo and the target speed ωt. Thus, periodic disturbance of the motor 11 is controlled using the compensated difference in the rotation speeds ωo and ωt that is being outputted to the motor 11 through the duty converter 22. The changing sound (roaring sound) from the motor 11 caused by periodic load change generated by instability in the axis of rotation of the motor 11 is also reduced or avoided.

As mentioned above, the actual rotation speed ωo and the target rotation speed ωt are calculated at the particular position corresponding to the rotation angle (particular position of the motor driven mechanical system) of the motor 11. Therefore, the speed change of the motor 11 by the disturbance depending on the periodic position is improved. In other words, although the periodic speed of the motor 11 at the particular position is collapsed under the target rotation speed being changed, the periodic disturbance is controlled.

The repetition control unit 24 in this embodiment includes a masking processor 25, a repetition compensation controller 26 and a phase compensator or phase converter 27. The difference between the actual rotation speed ωo and the target rotation speed ωt, which is obtained at point P5, is introduced into the masking processor 25 and then outputted to the repetition compensation controller 26 at point P7. The masking processor 25 has a changeover switch SW. The changeover switch SW changes between two different positions, one in which the difference between the rotation speed ωo and the target speed ωt is directly outputted to the repetition compensation controller 26 and another in which the value "0" (zero) is outputted to the repetition compensation control unit 26. During the starting time of the motor 11 in which the rotation angle is 0 to θ1 (θ1 is determined through experimentation based on the motor characteristics), the difference between the actual rotation speed ωo and the target rotation speed ωt is set at a value "0" (zero) so that the value outputted by the masking processor 25 to the repetition compensation control unit 26 is zero. Thus, the difference between the actual rotation speed ωo and the target rotation speed ωt used as a repetition tolerance in the repetition compensation controller 26 is made a value "0" representing a repetition error of zero, and the difference between the actual rotation speed too and the target rotation speed ωt is not put into a memory mentioned below. Rather, to avoid the affect of disturbance under the condition that the motor 11 is starting, and to perform the repetition compensation control effectively, "0" is put into the memory.

The repetition compensation controller 26 includes a repetition compensator 28 and a delay filter 29. The signal from point P7 is picked up at point P8 and is sent back to point P7 as an output signal from the repetition compensator 28 and the delay filter 29. The repetition compensator 28 is a memory which has a memorizing interval of L. To avoid periodic fluctuation at the particular position of the motor 11, the difference between the actual rotation speed ωo and the target rotation speed ωt (repetition tolerance) is put into the repetition compensator 28 to use in the next control cycle. The signal through the repetition compensator 28 and the delay filter 29 performs stabilization of the repetition compensation control and control system stability.

The signal from the repetition compensator controller 26 is inputted at point P6 by way of a phase compensator 27. The output signal from the repetition compensation controller 26 is thus shifted in phase by an amount "d" which corresponds to the response delay of the motor 11. The amount "d" is set at an appropriate value to compensate the delay of the motor 11 at the particular position. Therefore, the phase compensator 27 decreases an effect of the response delay of the motor 11 and improves its stability.

Figure 4:
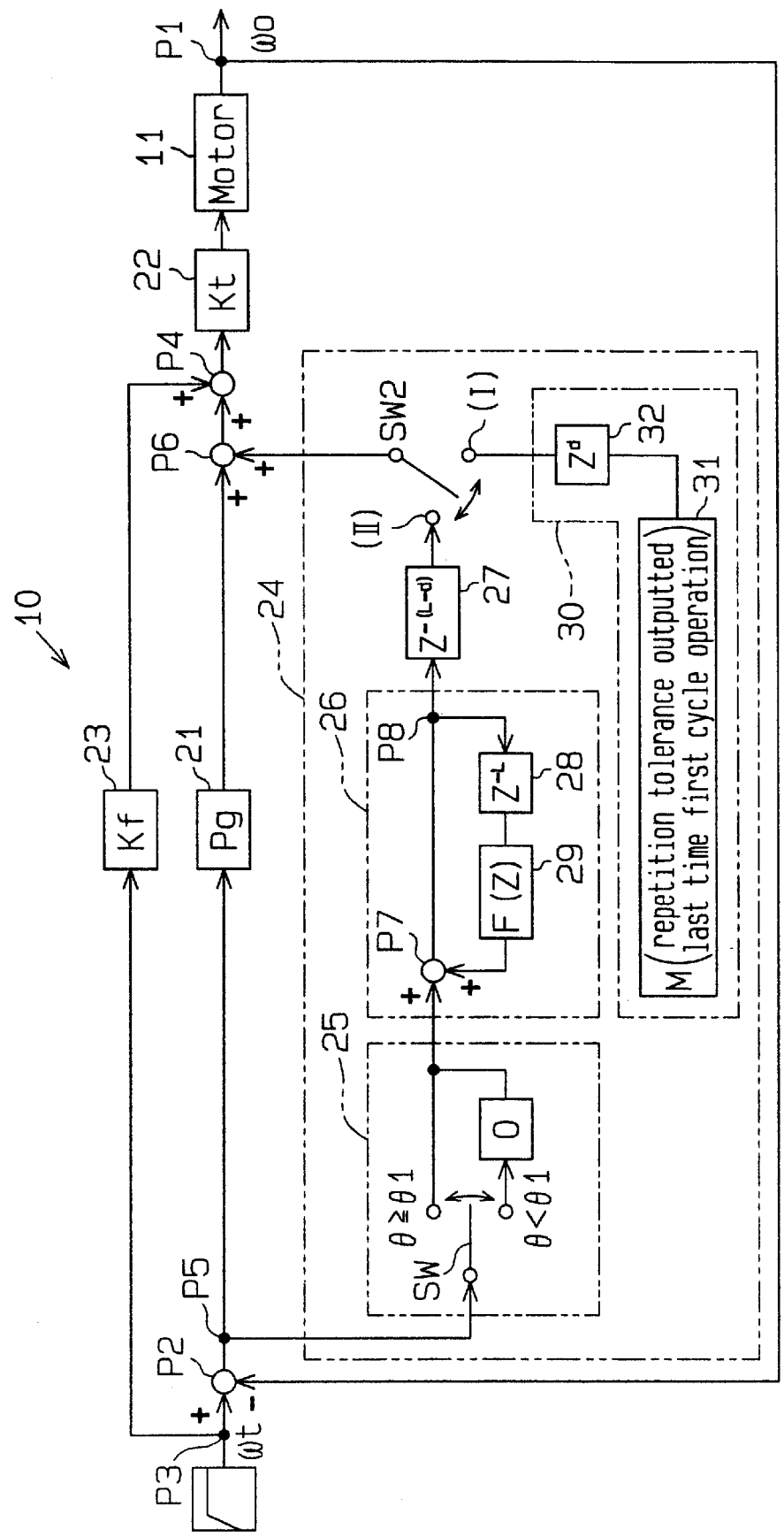
FIG. 4 is a block diagram or schematic illustration of a disturbance compensation control system according to a second embodiment of the present invention.

FIG. 4 shows another embodiment of the control system. This embodiment is similar to the first embodiment described above except that an initial repetition compensation controller 30 and a changeover switch SW2 are added to the first embodiment shown in FIG. 1. The initial repetition compensation controller 30 is equipped with a memory 31 and a phase compensator 32. The memory 31 memorizes a control tolerance which was output the last time (previous time) of the first cycle operation of the motor 11. The changeover switch SW2 is shiftable between two terminals (I) and (II). When the changeover switch SW2 is shifted to terminal (I), the initial repetition compensator controller 30 is connected to point P6, and a periodic disturbance is eliminated during an initial first cycle (invalid cycle). It is hard to eliminate enough disturbance during the first cycle in the known control system. However, by using the control tolerance which is output the last time of the first cycle operation of the motor 11, the motor control unit improves the control delay during the initial first cycle. Consequently, the motor control unit improves the control response to the target speed.

Figure 5:
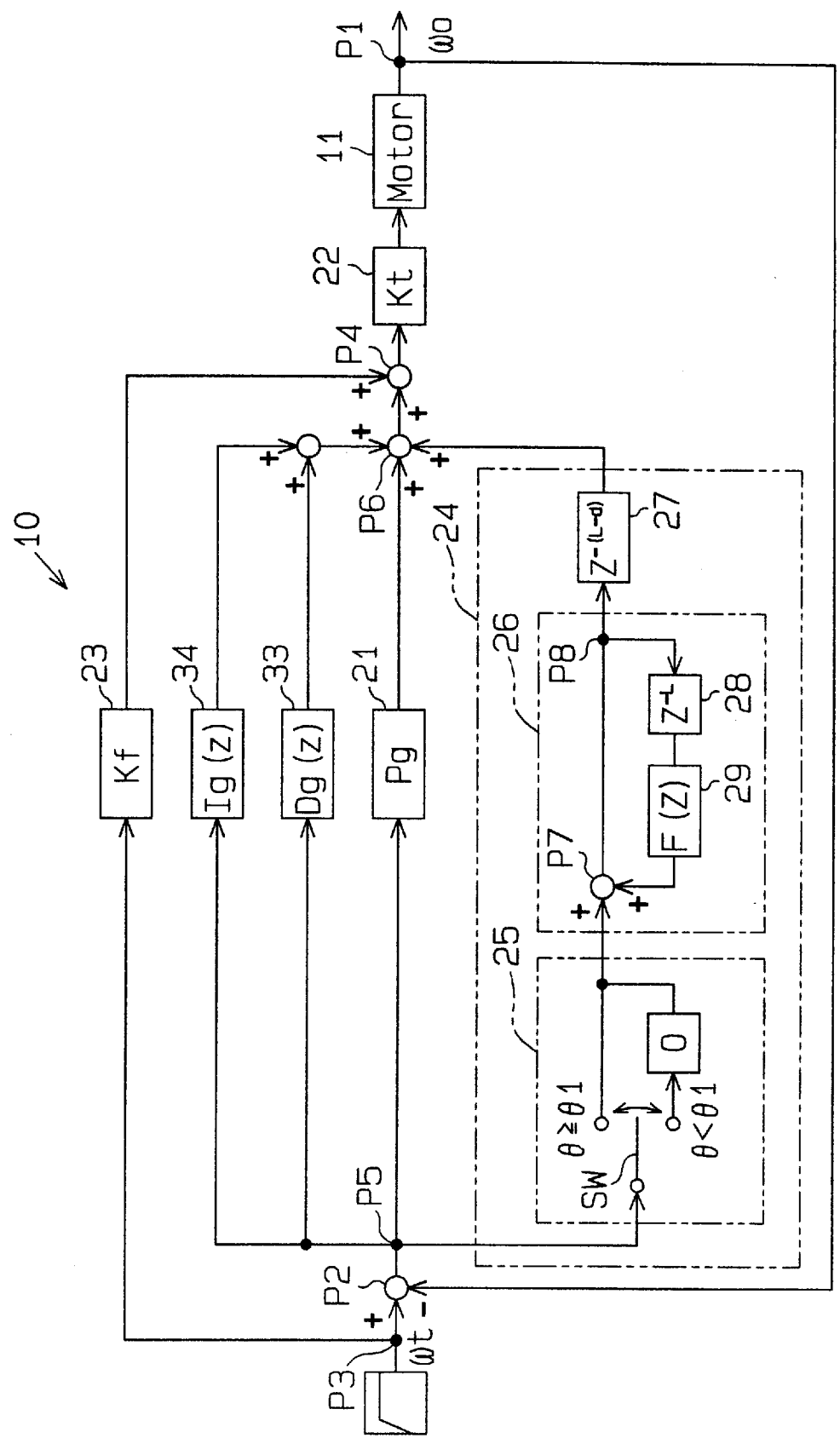
FIG. 5 is a block diagram or schematic illustration of a disturbance compensation control system according to a third embodiment of the present invention.

FIG. 5 shows a further another embodiment of the present invention. This third embodiment is also similar to the first embodiment described above, except that a differential calculator 33, that has a differential term Dg(z), and an integral calculator 34, that has integral term Ig(z), are added to the first embodiment shown in FIG. 1. These two calculators 33, 34 are also applicable to the second embodiment shown in FIG. 4.

The difference between the actual rotation speed ωo and the target rotation speed ωt from point P5 is output to point P6 through the differential calculator 33 and the integral calculator 34. The differential calculator 33 removes rapid fluctuations in the control tolerance while the integral calculator 34 removes constant deviations in the control tolerance. The control response to the target speed is thus improved using these two calculators. Especially improved responsiveness and stability are obtained using the proportional term Pg, and especially improved responsiveness is obtained during starting of the motor 11 using the feed forward term Kf.

According to one aspect of the control system described here, the control system does not process the repetition compensation control when the motor 11 is initially started. The control tolerance or difference between the the actual rotation speed ωo and the target rotation speed ωt is not put into the memory when the motor 11 is started. The repetition compensation control is effectively improved under the motor stable condition. The phase compensator 27 also improves the stability of the motor 11 by decreasing the response delay. The difference between the target rotation speed ωt and the actual rotation speed ωo is detected at the particular position. Therefore, the fluctuation of the rotation speed, which is caused by disturbance at the periodic or particular position (rotation angle) is improved.

The embodiments are not limited to those described above, and f various modifications can be employed to the embodiments. For example, a slow stop (gradually decreasing rotation speed) type motor can be applied to each embodiment. This type of motor reduces a beating sound or noise when the motor is stopped. In addition, the PWM control is described as being applied to the various embodiments, although analog control (adjusting current value or voltage value) can also be utilized. The control configuration shown in the various embodiments represents one example of a control configuration. In addition, the motor 11 represents an example of a control object with which the disclosed control systems can be employed.

In accordance with the disturbance compensation control system described here, appropriate repetition compensation control is conducted without being as susceptible to the difficulties mentioned above.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A disturbance compensation control system which restricts periodic disturbance of a motor comprising:
   means for calculating a target rotation speed of the motor;
   means for calculating an actual rotation speed of the motor;
   means for calculating a difference between the target rotation speed of the motor; and and the actual rotation speed of the motor; and
   a repetition control unit which receives the calculated difference between the target rotation speed of the motor and the actual rotation speed of the motor, and repeatedly applies a compensated value to the calculated difference, the compensated value applied by the repetition control unit during initial starting of the motor being based on a zero value of the difference between the target rotation speed of the motor and the actual rotation speed of the motor.

2. The disturbance compensation control system according to claim 1, wherein the repetition control unit includes an initial repetition compensation controller provided with a memory which stores the difference between the target rotation speed and the actual rotation speed during a previous first cycle operation.

3. The disturbance compensation control system according to claim 1, wherein the repetition control unit includes a masking processor, a repetition compensator controller and a phase converter, the masking processor outputting the zero value to the repetition compensator controller during initial starting of the motor and outputting the difference between the target rotation speed and the actual rotation speed to the repetition compensator controller after initial starting of the motor.

4. The disturbance compensation control system according to claim 3, wherein the repetition control unit also includes an initial repetition compensation controller provided with a memory which stores the difference between the target rotation speed of the motor and the actual rotation speed of the motor during a previous first cycle operation of the control object.

5. The disturbance compensation control system according to claim 1, including a differential calculator which differentiates the difference between the target rotation speed of the motor and the actual rotation speed of the motor, and an integral calculator which integrates the difference between the target rotation speed of the motor and the actual rotation speed of the motor.

6. A disturbance compensation control system which restricts periodic disturbance of a control object comprising:
   means for calculating a target control condition of the control object;
   means for calculating an actual control condition of the control object;
   means for calculating a difference between the target control condition of the control object and the actual control condition of the control object; and
   a repetition control unit which receives the calculated difference between the target control condition and the actual control condition, and applies a value to the calculated difference, the value applied by the repetition control unit during initial starting of the control object being based on a zero value of the difference between the target control condition and the actual control condition.

7. The disturbance compensation control system according to claim 6, wherein the repetition control unit includes a phase converter.

8. The disturbance compensation control system according to claim 7, wherein the repetition control unit also includes an initial repetition compensation controller provided with a memory which stores the difference between the target control condition and the actual control condition during a previous first cycle operation.

9. The disturbance compensation control system according to claim 6, wherein the repetition control unit includes a masking processor, a repetition compensator controller and a phase converter, the masking processor outputting the zero value to the repetition compensator controller during initial starting of the control object and outputting the difference between the target control condition and the actual control condition to the repetition compensator controller after initial starting of the control object.

10. The disturbance compensation control system according to claim 9, wherein the repetition control unit also includes an initial repetition compensation controller provided with a memory which stores the difference between the target control condition and the actual control condition during a previous first cycle operation of the control object.

11. The disturbance compensation control system according to claim 6, wherein the control object is a motor.

12. The disturbance compensation control system according to claim 6, including a differential calculator which differentiates the difference between the target control condition and the actual control condition, and an integral calculator which integrates the difference between the target control condition and the actual control condition.

13. A disturbance compensation control system which restricts periodic disturbance of a control object comprising:
    means for calculating a target control condition;
    means for calculating an actual control condition;
    means for calculating a difference between the target control condition and the actual control condition; and
    a repetition control unit which receives the calculated difference between the target control condition and the actual control condition, calculates a value based on the calculated difference and applies the value to the calculated difference, the repetition control unit including a phase converter which shifts a phase of the repetition control unit.

14. The disturbance compensation control system according to claim 13, wherein the repetition control unit also includes an initial repetition compensation controller provided with a memory which stores the difference between the target control condition and the actual control condition during a previous first cycle operation of the control object.

15. The disturbance compensation control system according to claim 13, wherein the repetition control unit includes a masking processor and a repetition compensator controller, the masking processor outputting the difference between the target control condition and the actual control condition to the repetition compensator controller after initial starting of the control object.

16. The disturbance compensation control system according to claim 15, wherein the repetition control unit also includes an initial repetition compensation controller provided with a memory which stores the difference between the target control condition and the actual control condition during a previous first cycle operation.

17. The disturbance compensation control system according to claim 13, wherein the control object is a motor.

18. The disturbance compensation control system according to claim 13, including a differential calculator which differentiates the difference between the target control condition and the actual control condition, and an integral calculator which integrates the difference between the target control condition and the actual control condition.

19. The disturbance compensation control system according to claim 13, wherein the repetition control unit includes a masking processor which outputs a signal and a repetition compensator controller which receives the signal output from the masking processor and outputs a signal, the phase converter receiving the signal from the repetition compensator controller and shifting a phase of the signal output from the repetition compensator controller.

20. The disturbance compensation control system according to claim 13, wherein the phase converter shifts the phase of the repetition control unit by an amount (d) which corresponds to a response delay of the control object.

21. The disturbance compensation control system according to claim 13, further comprising an amplifier having a feed forward term, the amplifier amplifying the target control condition and applying a compensated value to the calculated difference.

22. The disturbance compensation control system according to claim 13, further comprising feedback control means for controlling the control object based on the difference between the target control condition and the actual control condition.

* * * * *